United States Patent [19]

Oldshue

[11] 4,066,113
[45] Jan. 3, 1978

[54] REPLACEMENT VALVE ASSEMBLY

[76] Inventor: James Y. Oldshue, 141 Tyringham Road, Rochester, N.Y. 14617

[21] Appl. No.: 736,446

[22] Filed: Oct. 28, 1976

[51] Int. Cl.² .............................................. B60C 29/00
[52] U.S. Cl. .................................. 152/430; 152/349; 152/367; 152/370
[58] Field of Search ............... 152/429, 430, 349, 350, 152/367, 370, 371; 156/120

[56] References Cited

U.S. PATENT DOCUMENTS

| 1,800,178 | 4/1931 | Cooper et al. | 152/430 |
| 2,120,346 | 6/1938 | Becker | 156/120 |
| 2,285,008 | 6/1942 | Bronson | 152/430 |
| 3,802,981 | 4/1974 | Oldshue | 156/120 |

Primary Examiner—Drayton E. Hoffman

[57] ABSTRACT

An assembly for home installation replaces a metal-bodied valve in an inner tube with a vulcanized elastomeric valve so that the tube can be safely used for play, such as in a swimming pool. The assembly includes a vulcanized elastomeric cover having a diameter larger than the diameter of the flange of the elastomeric valve, with the cover having a vulcanized bond to the flange of the replacement valve. An annular disk of unvulcanized and vulcanizable material has a central opening fitting around the body of the replacement valve so that the disk underlies the inward facing surface of the valve flange. A nonvulcanizing adhesive temporarily adheres the disk to the flange, and an unvulcanized and vulcanizable material is provided under the cover radially outward from the flange. Release material overlies the unvulcanized material under the flange and the cover, and after the release material is stripped away, the assembly is bondable to the inner tube by vulcanizing the vulcanizable material to bond the flange, disk, cover, and inner tube all together.

8 Claims, 4 Drawing Figures

REPLACEMENT VALVE ASSEMBLY

BACKGROUND OF THE INVENTION

My previous U.S. Pat. No. 3,802,981 generally suggested a way of replacing a metal-bodied valve for an inner tube with a vulcanized elastomeric valve, but because of the materials and operations involved, the process suggested in that patent is not commercially practical for home installation. Replacement of metal-bodied valves with vulcanized elastomeric valves at a single assembly station greatly reduces the number of sales possible if valve replacement could be done at home by amateurs without special equipment or materials.

The invention aims at a replacement valve assembly that can be sold mail order or through stores to home users who can bond the assembly securely to vulcanized elastomeric articles such as inner tubes without requiring special tools or skill. The invention also aims at a secure and reliable bond that is completely vulcanized and secures a vulcanized elastomeric replacement valve to a previously vulcanized elastomeric article in an airtight bond that is reliable and long lasting, even during rough usage such as occurs in swimming pools.

SUMMARY OF THE INVENTION

The inventive assembly includes a vulcanized elastomeric valve having a body with a flange for replacing a metal-bodied valve in a vulcanized elastomeric article. The assembly includes a vulcanized elastomeric cover having a diameter larger than the diameter of the flange and means forming a vulcanized bond between a radially inner portion of the cover and the outward facing surface of the flange. An annular disk of unvulcanized and vulcanizable material has a central opening encircling the body with the disk underlying the inward facing surface of the flange, and a nonvulcanizing adhesive temporarily adheres the disk to the flange. Either the annular disk, or another layer of unvulcanized and vulcanizable material is adjacent the inward facing surface of the cover radially outward from the flange, and release material overlies the inward facing surface of the unvulcanized and vulcanizable material under the flange and the cover. After the release material is removed, the assembly is bondable to the vulcanized elastomeric article by vulcanizing the vulcanizable material to bond the flange, disk, cover, and article securely together in a vulcanized bond.

DRAWINGS

DETAILED DESCRIPTION

Replacing the metal-bodied valves of inner tubes and other vulcanized elastomeric articles with vulcanized elastomeric valves is more difficult than it might appear. Such articles expand in all directions as they are inflated, and the expansion occurs at different rates in different regions so that a thin walled portion expands considerably compared to a thicker-walled portion providing reinforcement around the original valve body. Ordinary adhesives cannot secure the replacement valve to such an expandable elastomeric body in a reliable way to maintain an airtight seal. This led to use of a vulcanized bond between the replacement parts and the original parts in the method suggested in my U.S. Pat. No. 3,802,981. Because the materials involved in the bond have to be vulcanized to secure the bond, the operations involved in practicing my previous invention were not commercially practical for home use.

The assembly of this invention is formed so that it can be installed at home by an amateur without any special materials or skill and will still produce a completely vulcanized bond integrating the replacement parts with the original parts in a secure and airtight seal. This is accomplished generally by use of vulcanizable but unvulcanized materials arranged so that proper application of bonding materials will result in a completely vulcanized bond.

Figure 1:
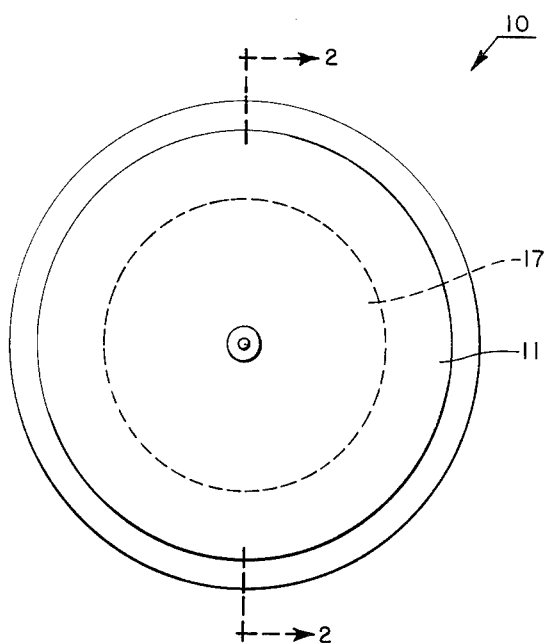
FIG. 1 is a plan view of a preferred embodiment of the inventive assembly.

Assembly 10 of FIG. 1 includes a vulcanized elastomeric cover 11 having an abrasion-resistant outer surface and preferably formed of rubber or synthetic rubber. The underside of cover 11 has an attached layer of unvulcanized but vulcanizable material that is also elastomeric in character, and cover 11 is preferably formed in circular disks as illustrated with a central hole to receive the head 13 of valve 15. Valve 15 also has a body 16 with a flange 17, as is conventionally known.

When cover 11 is originally supplied, unvulcanized and vulcanizable layer 12 is preferably protected with a removable release sheet that is removed before cover 11 is secured to the outward facing surface of flange 17. This is done by applying a vulcanizing cement that vulcanizes the unvulcanized layer 12 and forms a completely vulcanized bond between the outward facing surface of flange 17 and the inward facing surface of cover 11. Vulcanizing cements are effective only perpendicular to the surfaces on which they are applied, so that the portion of unvulcanized layer 12 that is radially outward from flange 17 is not vulcanized in the process of bonding cover 11 to flange 17.

Figure 2:
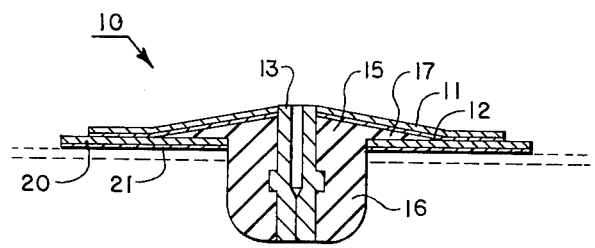
FIG. 2 is a cross sectional view of the assembly of FIG. 1 taken along the line 2—2 thereof.

An annular disk 20 of unvulcanized and vulcanizable material has a central opening that preferably closely encircles body 16 so that disk 20 can be slipped over body 16 and fit closely against flange 17 as best shown in FIG. 2. A nonvulcanizing cement is applied to the underside or inward facing surface of flange 17 and the inward facing surface of unvulcanized layer 12 on the underside of cover 11 radially outward from flange 17, and the nonvulcanizing cement temporarily adheres annular disk 20 to flange 17 and cover 11.

Disk 20 is preferably supplied with release sheets on both surfaces, and one of these is removed from the upper surface of disk 20 before tacking to the underside of flange 17 and cover 11. The other release sheet 21 remains in place to protect the unvulcanized material in disk 20 until the assembly is applied to a previously vulcanized alastomeric article. This is done by removing release sheet 21 and using vulcanizing cement purchased with assembly 10 to coat the surface of the article around the area where the metal-bodied valve was cut out and removed, and then pressing assembly 10 in place so that disk 20 is vulcanized in place and serves as a vulcanized bonding layer between flange 17, unvulcanized layer 12, and cover 11, for securely vulcanizing assembly 10 to the article.

Figure 3:
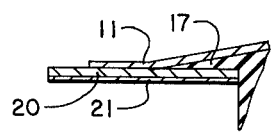
FIGS. 3 and 4 are fragmentary cross sectional views similar to the view of FIG. 2 and showing other preferred embodiments of the invention.

Another preferred embodiment of the inventive valve is shown in FIG. 3 and is identical to assembly 10 of FIG. 2, except that unvulcanized layer 12 on the underside of cover 11 is omitted, and a separately applied vulcanizing material is used to form a vulcanized bond between cover 11 and flange 17.

Figure 4:
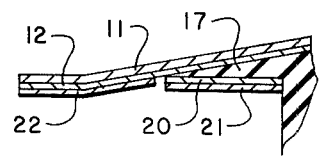

The assembly of FIG. 4 is also similar to the assembly of FIG. 2, except that annular disk 20 extends radially outward only to the periphery of flange 17, so that an additional release sheet 22 is provided to protect unvulcanized layer 12 on the underside of cover 11 radially outward from disk 20. Alternatively, release sheet 21 protecting disk 20 can extend radially outward from disk 20 and underlie and protect unvulcanized layer 12.

All of the preferred embodiments of the invention have an unvulcanized but vulcanizable layer positioned appropriately relative to valve 15 and cover 11, so that the home user need merely cut out the metal-bodied valve to be replaced in a vulcanized elastomeric article, remove the release material from the underside of the inventive assembly, apply a vulcanizing cement in the area where the assembly is to be bonded to the article, and securely press the assembly against the cement-coated area of the article to accomplish a complete vulcanization of all unvulcanized material for an integral bonding of the replacement valve to the article. Then when the article expands at differing rates in differing regions as it is inflated, the vulcanized bond is itself elastomeric enough to yield in response to the inflating forces and maintain a secure and airtight bond, even though the article is subjected to rough use such as in a swimming pool.

Vulcanizing cements capable of accomplishing the desired vulcanization of unvulcanized materials in the inventive assembly are generally known in the art, as are nonvulcanizing cements capable of temporarily tacking annular disk 20 in place prior to its vulcanization in the final bond of the inventive assembly to a previously vulcanized article. Workers skilled in the art will also appreciate the different materials and release sheets or protective covers that are available in the art for practicing the invention as applied to a variety of previously vulcanized articles.

What is claimed is :

1. An assembly including a vulcanized elastomeric valve having a body with a flange for replacing a metal-bodied valve in a vulcanized elastomeric article, said assembly comprising:

a. a vulcanized elastomeric cover having a diameter larger than the diameter of said flange;
   b. means forming a vulcanized bond between a radially inner portion of said cover and the outward facing surface of said flange;
   c. an annular disk of unvulcanized and vulcanizable material having a central opening encircling said body with said disk underlying the inward facing surface of said flange;
   d. a nonvulcanizing adhesive temporarily adhering said disk to said flange;
   e. means providing unvulcanized and vulcanizable material adjacent the inward facing surface of said cover radially outward from said flange;
   f. release material overlying the inward facing surface of said unvulcanized and vulcanizable material under said flange and said cover; and
   g. after removal of said release material, said assembly being bondable to said article by vulcanizing said vulcanizable material to bond said flange, disk, cover, and article all together in a secure, vulcanized bond.

2. The assembly of claim 1 wherein said means forming said bond between said cover and said flange is vulcanizable material applied to said flange.

3. The assembly of claim 1 wherein the inward facing surface of said cover has a layer of vulcanizable material that is vulcanized in said bond of said cover with said flange and unvulcanized radially outward from said flange.

4. The assembly of claim 1 wherein said annular disk has an outside diameter approximately equal to the diameter of said flange.

5. The assembly of claim 1 wherein said annular disk extends radially outward from said flange and underlies said cover.

6. The assembly of claim 5 wherein the inward facing surface of said cover has a layer of vulcanizable material that is vulcanized in said bond of said cover with said flange and unvulcanized radially outward from said flange.

7. The assembly of claim 5 wherein said annular disk has an outside diameter slightly larger than the diameter of said cover.

8. The assembly of claim 5 wherein said nonvulcanizing adhesive temporarily adheres said disk to said cover.

* * * * *